A. C. PRATT.
APPARATUS FOR MAKING GROMETS.
APPLICATION FILED APR. 30, 1918.
1,327,170.
Patented Jan. 6, 1920.
3 SHEETS—SHEET 1.
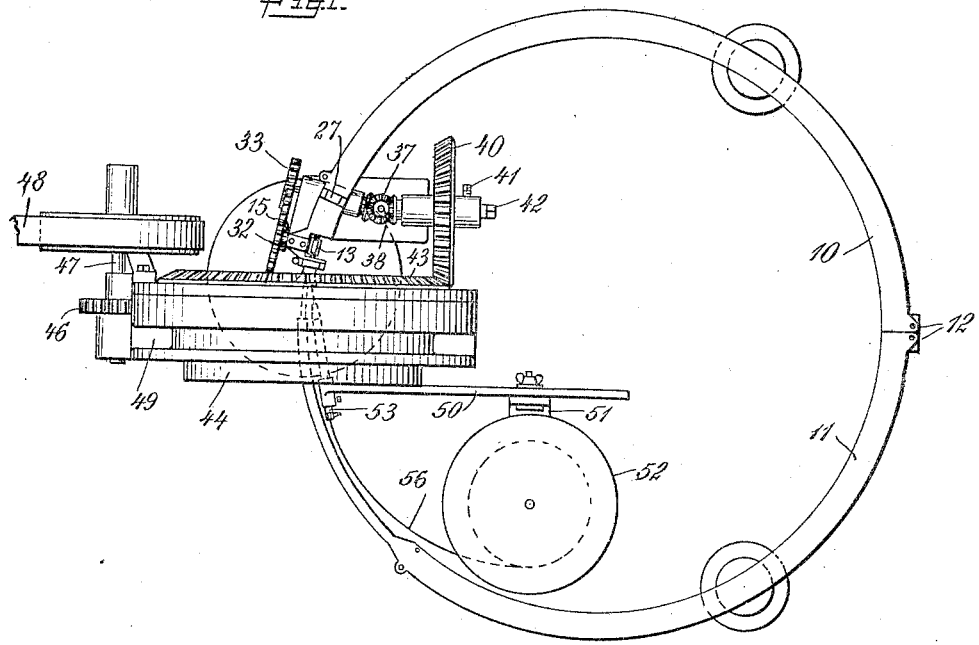
Fig. 1.
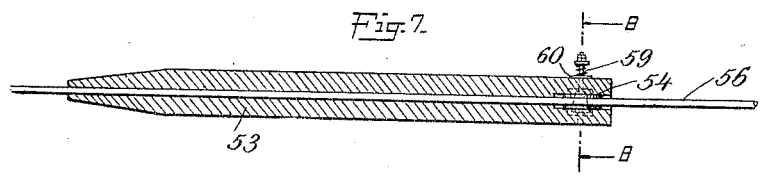
Fig. 7.
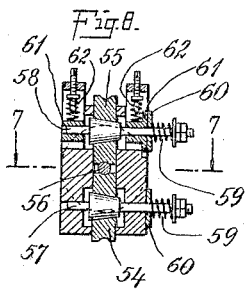
Fig. 8.
INVENTOR
A. C. Pratt,
BY
ATTORNEYS.

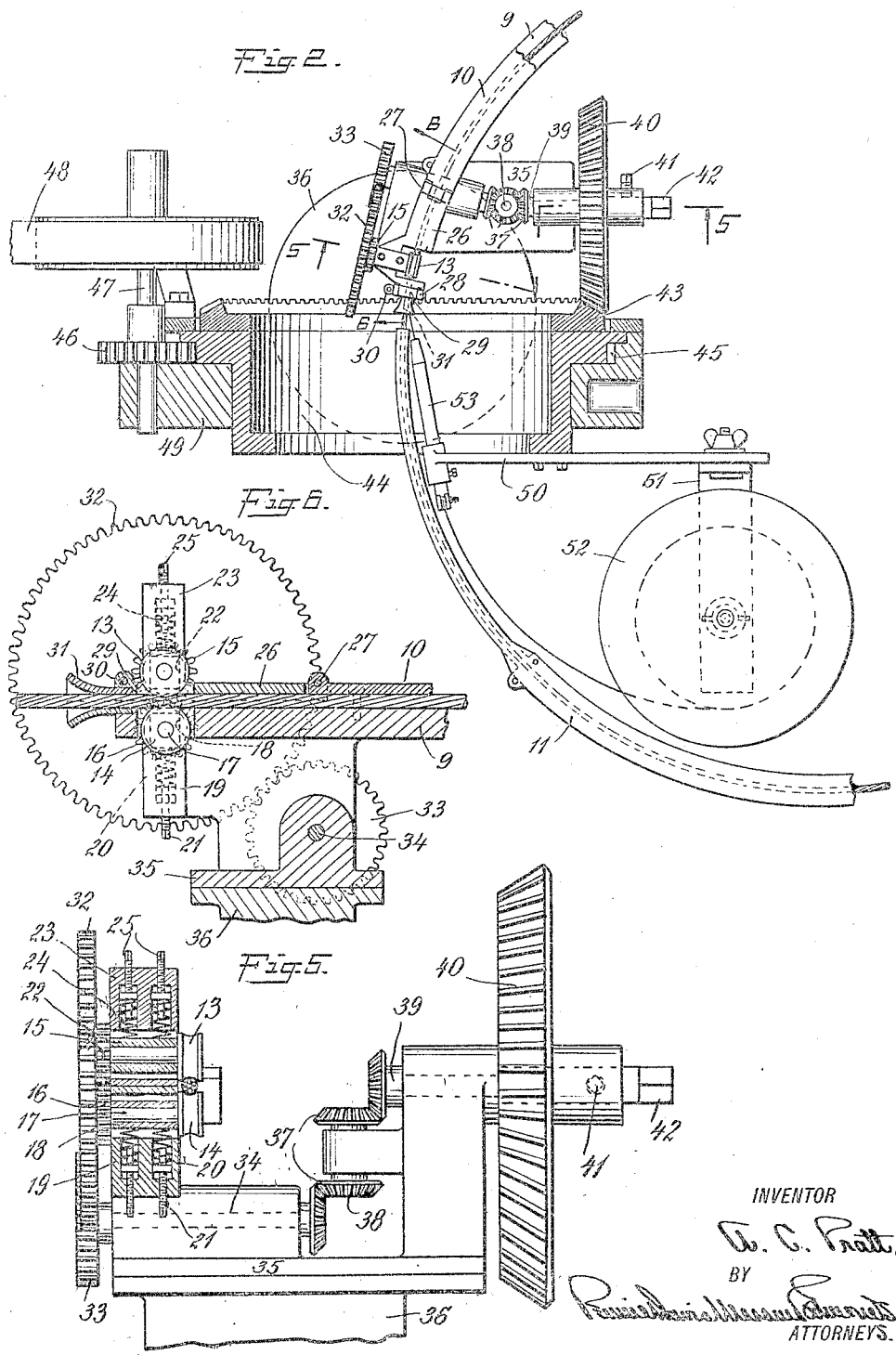

A. C. PRATT.
APPARATUS FOR MAKING GROMETS.
APPLICATION FILED APR. 30, 1918.
1,327,170.
Patented Jan. 6, 1920.
3 SHEETS—SHEET 3.
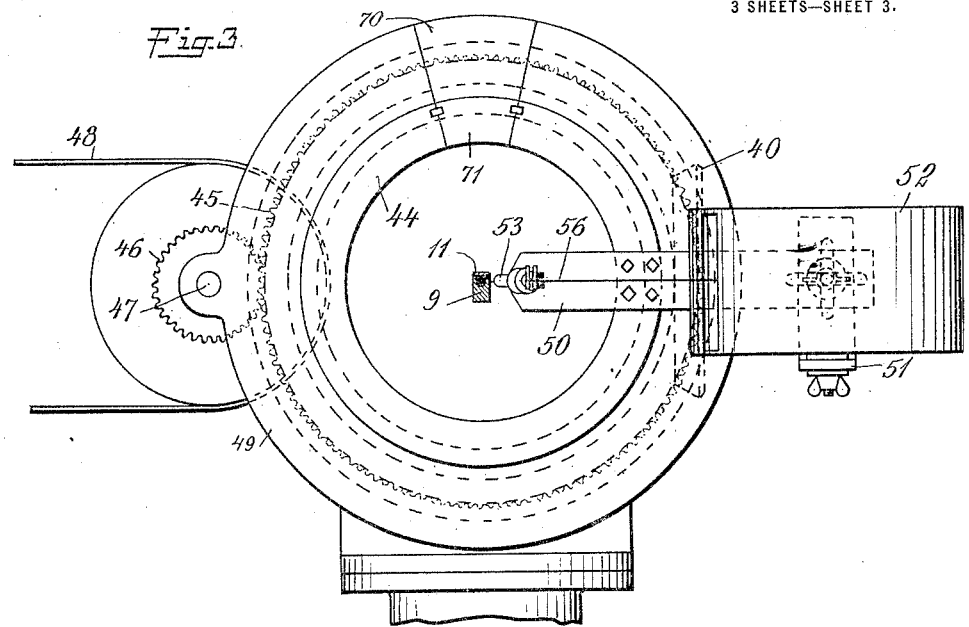
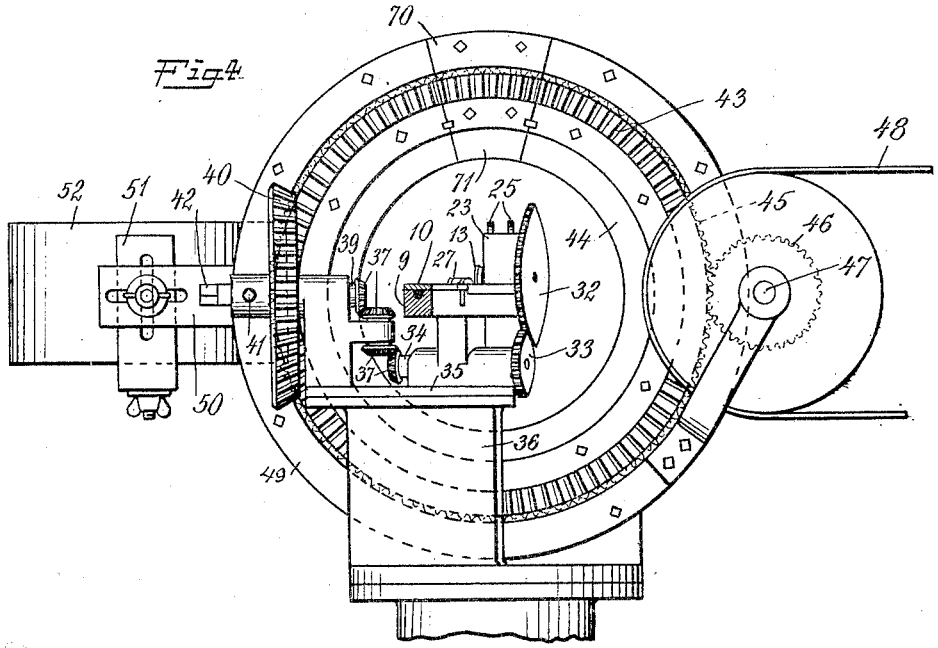
INVENTOR
A. C. Pratt,
BY
ATTORNEYS.

UNITED STATES PATENT OFFICE.

ALPHONSO COMSTOCK PRATT, OF DEEP RIVER, CONNECTICUT.

APPARATUS FOR MAKING GROMETS.

1,327,170.  Specification of Letters Patent.  Patented Jan. 6, 1920.

Application filed April 30, 1918. Serial No. 231,661.

*To all whom it may concern:*

Be it known that I, ALPHONSO COMSTOCK PRATT, a citizen of the United States, residing at Deep River, in the county of Middlesex, State of Connecticut, have invented certain new and useful Improvements in Apparatus for Making Gromets; and I do hereby declare the following to be a full, clear, and exact description of the invention, such as will enable others skilled in the art to which it appertains to make and use the same.

This invention relates to the art of making gromets of the type now commonly used in automobile tires, more particularly tires of the so-called "straight side" type. The manufacture of such gromets as heretofore conducted, has been primarily a manual operation requiring the expenditure of considerable time and labor and making the cost of the completed gromets comparatively high. The present invention is directed to the provision of a method and apparatus for making gromets whereby material saving in the cost of production is effected without any sacrifice in the strength or other desirable characteristics of the gromets.

Gromets of the type commonly used in the manufacture of automobile tires consist of a plurality of convolutions of a single length of wire, one convolution forming a core and the other convolutions being bent to a spiral formation and wound upon this core. Thus, a usual construction consists of seven convolutions, a core, and six convolutions of spirals thereon, the spirals of the six convolutions lying side by side around the circumference of the gromet.

The method of making gromets constituting the present invention involves first making a core by bending the end of a piece of wire to a circle of the size of the completed gromet and then moving this core in the form of a ring continuously about the axis of the ring and at the same time winding the spirals of the outer convolutions upon the core by causing the feeding of the core to draw the wire off from a supply device while that supply device is being constantly rotated about the core in correspondence with the feeding movement of the core about its axis. Thus, a circular support for the core and the partially completed gromet may be provided and a pair of power-driven feeding rollers pressed toward each other by suitable springs may be mounted in position for feeding the core and the partially completed gromet about the axis of the circular support. In combination with these parts, a reel for the wire from which the gromet is made may be mounted upon a rotary supporting device by which the reel may be rotated about the core and the partially completed gromet in correspondence with the feeding movement of the gromet about its axis. As the gromet is fed about its axis, it draws the wire from the supply reel and the rotational movement of the supply reel causes the wire to be wound spirally upon the core and as successive convolutions of the gromet are wound, the spirals thereof assume their appropriate positions side by side upon the core. A tensioning device is preferably employed in conjunction with the supply reel so as to subject the wire which is applied to the core to considerable tension whereby the wire is bent to its spiral formation and laid tightly upon the core.

The preferred procedure involves interrupting the operation of winding the spirals upon the core prior to the completion of the last convolution of spirals, cutting the wire forming the core at a suitable distance back from the joint between the ends of the length of wire forming the core, and withdrawing the portion of the core so cut; then the operation of winding the spirals is resumed so as to complete the formation of the desired number of convolutions of spirals and a straight length of wire extending beyond the end of the last convolution of spirals and corresponding in length to the portion of the core that was cut away is forced in between the spirals so as to lie within them and complete the circle of the core.

The structural characteristics of a machine constructed in accordance with the present invention and my improved method of operation will be better understood by reference to the following description taken in connection with the accompanying drawings which illustrate the construction of the machine at present preferred. In these drawings, Figure 1 is a plan view of the machine; Fig. 2 is a view of certain of the parts shown in Fig. 1 on an enlarged scale, some of the parts being in horizontal section; Fig. 3 is a view in elevation of the parts shown in Fig. 2; Fig. 4 is a view in elevation of the parts shown in Fig. 3 from the opposite side thereof; Fig. 5 is a sectional detail view on line 5—5 of Fig. 2; Fig. 6 is a sectional detail view along the axis of the core of the gromet as indicated by the reference numerals 6—6 on Fig. 2; Fig. 7 is a sectional view through the guide for the wire, the section being on line 7—7 of Fig. 8; and Fig. 8 is a sectional view of the tension device on line 8—8 of Fig. 7.

Referring to these drawings, a circular support is provided as shown in Fig. 1 for supporting the core and the partially completed gromet during the operation of winding the convolutions of spirals upon the core. This circular support consists of a ring 9 having a trough in the upper face thereof corresponding to the size of the completed gromet. A cover is provided for covering the groove and holding the gromet in place. This cover preferably consists of two substantially semi-circular parts 10 and 11 pivoted upon the ring 9 at 12 so that the two portions of the cover may be moved away from each other about the vertical axes 12 to permit of removing a completed gromet from the groove in the ring 9. The core of the gromet and the partially completed gromet are moved around in the groove in the supporting ring 9 about the axis of the circle of the gromet by a pair of feeding rollers 13 and 14. These rollers are provided with intermeshing gears 15 and 16. The shaft 17 of the lower feeding roller 14 lies within an opening in a journal 18 which is adapted to move vertically in ways formed in a block 19 which is integral with or secured to the ring 9 in an opening near one end of the ring, the ring being interrupted for a short space at the point where the spirals are laid upon the core, as shown in Fig. 2. The journal 18 carrying the feeding roller 14 is constantly pressed upwardly in the ways in the block 19 by spiral springs 20 which may be provided with means for adjusting their tension, as indicated at 21 in Fig. 5. The shaft of the upper feeding roller 13 is similarly carried by a journal 22 which is mounted for vertical movement in a block 23 and the roller 13 is similarly pressed downwardly by springs 24 whose tension may be adjusted as shown at 25. The block 23 which carries the upper roller 13 is secured to or formed integral with a plate 26 which is connected by a hinge 27 to the end of the cover-plate 10 for one-half of the ring support 9. Thus, the whole plate 26 and the upper feeding roller 13 carried by it may be swung about a horizontal axis to raise the roller 13 from the roller 14. At the extreme end of the ring 9 just beyond the block 19 are a pair of integral spaced perforated ears 28 extending upwardly from it and on the end of the plate 26 is a perforated projection 29 adapted to fit between the ears 28 when the plate 26 is swung to its downward position as shown in Fig. 6. A pin 30 may be inserted through the perforations in the ears 28 and projection 29 to hold the plate 26 in this operative position with the feeding rollers 13 and 14 in position for coaction with the convolution forming the core of the gromet or several convolutions of the partially completed gromet. The plate 26 with its projection 29 also has one-half of a funnel-shaped mouth-piece 31 formed on it and coöperating with a similarly formed portion of the mouthpiece on the end of the ring 9.

The shaft of the upper feed roller 13 is extended beyond the gear 15 and carries a gear 32 which meshes with a pinion 33 carried by a shaft 34 which is mounted in bearings formed on a supporting plate 35 which is secured to the supporting structure 36 of the ring 9. Two pairs of beveled gears 37 and a short shaft 38 mounted on the plate 35 connect the shaft 34 with a shaft 39 on which is a bevel gear 40, the hub of which is provided with a threaded opening to receive a set screw 41 by which the gear 40 may be secured to the shaft 39. The end of shaft 39 is squared as shown at 42 for the application of a tool by which the shaft 39 and the parts driven thereby may be rotated by hand when desired.

The gear 40 meshes with a gear 43 secured to a ring 44 on which are gear teeth 45 meshing with a pinion 46 on a driving shaft 47 to which rotary motion may be communicated in any suitable manner, as by means of the belt 48 running on a pulley on the shaft. The ring 44 may be rotated by this gearing in a stationary supporting ring 49 mounted upon the supporting structure of the machine, and when this ring rotates with its gear 43 in mesh with the gear 40, its rotary motion drives the feeding mechanism above described consisting of the feeding rollers 13 and 14 which are connected to the shaft of the gear 40. Secured to the rotating ring 44 is an arm 50 carrying a yoke 51 in which a supply reel 52 is mounted for rotation on its axis.

The arm 50 also carries a guide 53 for the wire which is wound to form the convolutions of the gromet. This guide is shown in section in Fig. 7. It consists of a cylindrical piece of metal with an axial opening through it corresponding in size closely to the size of the wire from which the gromet is made. A tension device is employed for resisting the pull of the wire through the guide 53. This tension device may be of any suitable construction, such for instance, as that shown in Fig. 8. In that figure, the tension device is shown as consisting of a pair of rollers 54 and 55 having grooves in their peripheries in which the wire 56 is received. These rollers have conical openings through them and are mounted on shafts 57 and 58 on which are conical surfaces corresponding to the openings through the rollers. Each of the shafts 57 and 58 is under tension in the direction of its axis exerted by a spring 59 between a washer 60 resting against the bearing for the shaft and adjustable nuts on the threaded end of the shaft. The bearings 61 for the shaft 58 of the upper roller 55 are movable in ways and are pressed by springs 62 downwardly to cause the wire 56 to be gripped between the rollers 54 and 55.

The operation of the mechanism thus constructed in the manufacture of a gromet will now be described. A reel of wire 52 is mounted in position upon the support 51 and the end of the wire is carried between the tension rollers 54 and 55 and through the guide 53 and its end is inserted through the funnel 31 and between the feeding rollers 13 and 14. The set screw 41 of the gear 40 is loosened and the gear is moved back out of mesh with the gear 43. Then a crank is applied to the squared end of the shaft 39 and that shaft is turned so as to rotate the feed rollers 13 and 14 in a direction to feed the wire between them. The wire is thus drawn off from the reel 52 through the guide 53 and fed around in the trough in the supporting ring 9 until one complete convolution of wire free from spirals is formed. This manner of feeding the wire by hand is continued until the extreme end of the wire has been carried all the way around about the axis of the ring 9 and enters between the feeding rollers 13 and 14 so that those rollers then grip the extreme end of the wire and also the wire at the other end of that convolution which forms the core. The gear 40 is then moved back into mesh with the gear 43 and is secured upon shaft 39 by a set screw 41, the crank being removed from the end 42 of the shaft. Power is then applied to the shaft 47 to rotate the rotary ring support 44. This causes the reel of wire 52 and the guide 53 to be rotated about the core of the gromet and at the same time it drives the feeder rollers 13 and 14 through the gears 43 and 40. Thus, the core of the gromet is fed continuously about the axis of the circle of the core and in correspondence with this feeding movement of the partially completed gromet the reel 52 from which the wire is supplied is rotated about the core. The feeding movement of the core and the grip of the feeding rollers upon the wire causes the wire to be drawn off from reel 52 in correspondence with the feeding movement of the gromet and as the wire is drawn off from the reel it is wound spirally upon the core. The grip of the tension rollers 54 and 55 and the friction of the wire as it is drawn through the opening in the guide 53, together with the rotation of these parts and the continuous feeding movement of the core, cause the wire drawn from the reel to be wound spirally upon the core. The wire passes into the funnel 31 as the core is drawn into the funnel by the feeding movement, and it is laid on the core in a succession of spirals. The feeding movement must be accurately proportioned so that after the first convolution of spirals is laid upon the core, the spirals of the second convolution will take position close beside the spirals of the first convolution. The operation is continued in this manner, applying successive convolutions of spirals to the core until the spaces between the spirals of the first convolution have been filled.

In order to take care of the end of the piece of wire from which the gromet is formed properly, I prefer to interrupt the operation of winding the convolutions of spirals upon the core somewhat prior to the completion of the last convolution of spirals. Then, with a suitable tool it is possible to cut off a short length of wire at the end of the core, that is, a short piece of the wire forming the core from the end which was first fed into the groove in the ring 9. This piece of wire may be cut off by inserting a cutting tool between the spirals wound on the core and the piece so severed may then be entirely withdrawn. Then, after completing the last convolution of spirals, a length of straight wire may be provided at that end of the piece from which the gromet is formed, for instance, by cutting the piece of wire at a point between the guide 53 and the reel 52. In this condition the gromet may be removed from the machine by withdrawing the pin 30, turning the plate 26 through substantially 180°, and moving the cover-plates 10 and 11 about the axes 12 to permit the gromet to be removed from the groove in ring 9. The gromet still lies within the stationary ring 49 and the rotary ring 44, and in order to permit of its removal therefrom these two rings are provided with removable and replaceable sections as is indicated at 70 and 71 on Figs. 3 and 4. After the gromet in this condition has been removed from the machine, the straight piece of wire at the end of the last convolution of spirals is forced in between spirals so as to occupy the central space for the core provided by cutting away a portion of the complete core originally formed. If this straight extension of the last convolution of the gromet be cut accurately as to its length, it will complete the core accurately and its end will abut against the other end of the length of wire from which the gromet is formed, and if desired, these two ends may be welded together electrically.

If the size of the wire employed in the manufacture of a gromet and the character of the metal of the wire make it difficult to start the spiraling of the wire after the core has been completed by reason of the feeding rollers 13 and 14 failing to grip the wire at the ends of the core and hold them with sufficient firmness, the two pieces of wire may be welded together so as to insure that the core will offer sufficient resistance to the pull of the wire passing through the guide 53 to cause that wire to be wound spirally upon the core. For this purpose the feed of the wire for the core will be continued until the extreme end of the wire, after passing all the way around through the groove in the ring 9, comes between the feed rollers 13 and 14. Then the pin 30 would be withdrawn and the plate 26 turned to its open position. Then with a suitable electric welding tool the end of the wire would be electrically welded to the portion of the wire lying at its side. Then, on restoring the plate 26 to its original position, the two feed rollers 13 and 14 would grip the core and feed the entire core around about the axis of the circle of the ring 9, insuring that the wire passing from the guide 53 into the funnel 31 would be spiraled upon the core properly.

I claim:

1. The method of making a gromet which consists in bending the end portion of a piece of wire to a circle and supporting the wire against displacement from the position to constitute a core for the gromet and then automatically feeding this circular core continuously about the axis of the circle of the core while thus supported and at the same time rotating the wire from which the gromet is formed about the core in correspondence with the feeding movement of the core to lay the wire in regular spirals upon the core; substantially as described.

2. The method of making a gromet which consists in drawing off wire from a reel and bending it to a circle to form a core, supporting the core against displacement from position, gripping the wire at the ends of the core, and automatically feeding the core continuously about the axis of the circle of the core while thus supported, and at the same time rotating the reel of wire about the core in correspondence with the feeding movement of the core to wind successive convolutions of regular spirals upon the core; substantially as described.

3. The method of making a gromet which consists in drawing off wire from a reel and bending it to a circle to form a core and supporting it against displacement from position, causing a feeding device to grip the wire at the ends of the core and then operating the feeding device to automatically feed the core continuously about the axis of the circle of the core while thus supported and rotating the reel of wire about the core in correspondence with the feeding movement of the core to wind successive convolutions of regular spirals of the wire upon the core; substantially as described.

4. A machine for making gromets comprising a circular element in which the circular core of a gromet and a partially completed gromet are positively supported throughout the entire extent thereof, a feeder for gripping the core and the partially completed gromet, means for operating the feeder to feed the partially completed gromet about the axis of the circular support therefor, means for supporting a reel of the wire from which the gromet is formed, and means for rotating the reel about the partially completed gromet in correspondence with the feeding movement of the gromet about its axis; substantially as described.

5. A machine for making gromets comprising the combination of a circular element in which the circular core of a gromet and a partially completed gromet are positively supported throughout the entire extent thereof, a pair of feeding rollers adapted to grip the core and the partially completed gromet between them, a reel for the wire from which the gromet is formed, and a single means for rotating the reel of wire about the gromet and for operating the feeding rollers to feed the partially completed gromet continuously about its axis; substantially as described.

6. A machine for making gromets comprising the combination of a rotary ring, a guide carried by the ring, a reel carried by the ring for the wire from which the gromet is formed, which wire passes through the guide, a circular support for the partially completed gromet extending through the ring, and means for feeding a partially completed gromet along the support and about its axis and rotating the ring carrying the reel and the guide in correspondence with the feeding movement of the gromet; substantially as described.

7. A machine for making gromets comprising the combination of a rotary ring, a support thereon for the wire from which the gromet is formed, a tension device carried by the ring for subjecting the wire to tension, a circular support for the partially completed gromet passing through the ring, and means for feeding a partially completed gromet about its axis upon the circular support and for rotating the ring carrying the reel and the tension device in correspondence with the feeding movement of the gromet; substantially as described.

In testimony whereof I affix my signature.

ALPHONSO COMSTOCK PRATT.